US012808668B2

(12) United States Patent
Guerinoni et al.

(10) Patent No.: US 12,808,668 B2
(45) Date of Patent: Nov. 24, 2026

(54) MICROELECTROMECHANICAL DEVICE WITH TEST STRUCTURE, TEST EQUIPMENT FOR TESTING MICROELECTROMECHANICAL DEVICES AND METHOD FOR MANUFACTURING A MICROELECTROMECHANICAL DEVICE

(71) Applicant: STMICROELECTRONICS S.r.l., Agrate Brianza (IT)

(72) Inventors: Luca Guerinoni, Alzano Lombardo (IT); Patrick Fedeli, Senago (IT); Luca Giuseppe Falorni, Limbiate (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 431 days.

(21) Appl. No.: 18/515,075

(22) Filed: Nov. 20, 2023

(65) Prior Publication Data

US 2024/0175682 A1 May 30, 2024

(30) Foreign Application Priority Data

Nov. 30, 2022 (IT) ........................ 102022000024732

(51) Int. Cl.
*G01C 25/00* (2006.01)
*G01C 19/5712* (2012.01)

(52) U.S. Cl.
CPC ......... *G01C 19/5712* (2013.01); *G01C 25/00* (2013.01)

(58) Field of Classification Search
CPC ................ G01C 19/5712; G01C 25/00; G01C 19/5733; G01C 19/5719; G01C 19/5769; B81B 7/02; B81C 1/00015; B81C 99/004; B81C 99/005
See application file for complete search history.

(56) References Cited

U.S. PATENT DOCUMENTS

| | | | | |
|---|---|---|---|---|
| 6,257,059 B1 * | 7/2001 | Weinberg | G01C 19/5719 73/504.16 |
| 6,750,152 B1 * | 6/2004 | Christenson | B81C 99/004 438/719 |
| 2002/0184949 A1 * | 12/2002 | Gianchandani | H01H 1/0036 73/514.32 |
| 2006/0150745 A1 * | 7/2006 | Lang | G01C 19/5776 73/849 |
| 2008/0150554 A1 * | 6/2008 | Wang | G01C 19/5769 324/686 |
| 2009/0114016 A1 * | 5/2009 | Nasiri | G01C 19/5719 73/514.32 |
| 2011/0041609 A1 * | 2/2011 | Clark | G01C 19/5712 73/514.29 |

(Continued)

*Primary Examiner* — David J Bolduc
(74) *Attorney, Agent, or Firm* — Seed IP Law Group LLP

(57) ABSTRACT

A microelectromechanical device includes: a support body; at least one movable mass of semiconductor material, elastically constrained to the support body so as to be able to oscillate; fixed detection electrodes rigidly connected to the support body and capacitively coupled to the at least one movable mass; and at least one test structure of semiconductor material, rigidly connected to the support body and distinct from the fixed detection electrodes. The test structure is capacitively coupled to the at least one movable mass and is configured to apply electrostatic forces to the at least one movable mass in response to a voltage between the test structure and the at least one movable mass.

18 Claims, 6 Drawing Sheets

(56) References Cited

U.S. PATENT DOCUMENTS

| | | | | |
|---|---|---|---|---|
| 2011/0088469 | A1 * | 4/2011 | Neul | G01C 19/5712 73/504.12 |
| 2013/0001550 | A1 * | 1/2013 | Seeger | G01L 9/0073 438/15 |
| 2015/0260597 | A1 * | 9/2015 | Pagani | G01L 27/002 29/25.35 |
| 2016/0169933 | A1 | 6/2016 | Ohms | |
| 2018/0038692 | A1 * | 2/2018 | Prati | G01C 19/574 |
| 2019/0072389 | A1 * | 3/2019 | Prati | G06F 12/0817 |
| 2019/0219468 | A1 * | 7/2019 | Duqi | G01L 27/002 |
| 2020/0049505 | A1 * | 2/2020 | Gattere | G01C 19/5712 |
| 2021/0002126 | A1 * | 1/2021 | Alessi | G01C 19/5776 |
| 2021/0363000 | A1 | 11/2021 | Allegato et al. | |
| 2022/0205784 | A1 * | 6/2022 | Gattere | G01C 19/5712 |
| 2022/0234883 | A1 * | 7/2022 | Belloni | B81B 3/0018 |
| 2024/0010490 | A1 * | 1/2024 | Gattere | B81B 7/02 |

* cited by examiner

MICROELECTROMECHANICAL DEVICE WITH TEST STRUCTURE, TEST EQUIPMENT FOR TESTING MICROELECTROMECHANICAL DEVICES AND METHOD FOR MANUFACTURING A MICROELECTROMECHANICAL DEVICE

BACKGROUND

Technical Field

The present disclosure relates to a microelectromechanical device with a test structure, a test equipment for testing microelectromechanical devices and a method for manufacturing a microelectromechanical device.

Description of the Related Art

As is known, microelectromechanical devices with complex structures, such as inertial sensors and in particular gyroscopes, may be subject to unwanted vibration modes triggered in the presence of stresses at certain frequencies.

For example, uniaxial, biaxial or triaxial microelectromechanical gyroscopes may include one or more drive masses and one or more detection masses, elastically constrained to a substrate and to each other, so as to have predetermined relative degrees of freedom. In use, the drive masses are set to oscillation with controlled drive frequency and amplitude and drag the detection masses, which in turn vibrate according to the degrees of freedom allowed by the constraints if the gyroscope rotates around corresponding rotation axes. In some cases, a single mass may be constrained to the substrate with multiple degrees of freedom and is used as both drive mass and detection mass. The vibration modes that generate the useful signal are also said operational vibration modes and the operation of the gyroscopes is based thereon.

However, the higher harmonics of the drive frequency may fall in the vicinity of natural frequencies of spurious vibration modes, which may thus be triggered and, in some circumstances, distort the response of the device. In gyroscopes, spurious resonance modes may be due both to nonlinearities of the structure and to forcing, typically of square-wave type.

The effects of spurious vibration modes may be partially mitigated with some measures. For example, the microstructure (drive masses, detection masses and constraints) may be designed with a twofold perspective: on the one hand, making sure that the resonance frequencies associated with the spurious vibration modes are far enough from the harmonics of the drive frequency to avoid the triggering of unwanted phenomena during operation; and on the other hand, reducing the mechanical nonlinearities of the microstructure. Furthermore, the square-wave forcing may then be replaced by a sinusoidal forcing, which generates lower contributions in terms of higher harmonics.

Despite the precautions, however, the intrinsic process variabilities inevitably cause a certain percentage of rejects out of the total, both because the microstructure is so complex that it is practically impossible to control all possible spurious vibration modes, and because limiting the mechanical nonlinearities, which is already difficult per se, may often clash with the increasingly frequent request of reducing the dimensions of the same devices. Even sinusoidal forcing is often impractical, because it is excessively expensive in terms of energy consumption and architectural complexity.

The problem of rejects due to the presence of spurious vibration modes, in addition to not being able to be eliminated, is critical because the tests on the devices may only be performed at the end of the assembly on the finished product. As a result, not only do defective devices have to be eliminated, but the time, machines and materials utilized for assembly and packaging are also wasted.

BRIEF SUMMARY

Embodiments of the present disclosure provide a test equipment for testing microelectromechanical devices and a method for manufacturing a microelectromechanical device which allow the limitations described to be overcome or at least mitigated.

According to the present disclosure there are provided a microelectromechanical device with a test structure, a test equipment for testing microelectromechanical devices and a method for manufacturing a microelectromechanical device.

In one embodiment, a microelectromechanical device includes a support body and at least one movable mass of semiconductor material elastically constrained to the support body to oscillate along one or more axes. The microelectromechanical device includes fixed detection electrodes rigidly connected to the support body and capacitively coupled to the at least one movable mass and at least one test structure of semiconductor material, rigidly connected to the support body and distinct from the fixed detection electrodes. The at least one test structure is capacitively coupled to the at least one movable mass and is configured to apply electrostatic forces to the at least one movable mass in response to a voltage between the at least one test structure and the at least one movable mass.

In one embodiment, a test equipment for testing microelectromechanical devices includes a semiconductor wafer integrating a plurality of microelectromechanical devices and a test machine connected to the pads of the microelectromechanical devices and including at least one test signal generator configured to apply a test voltage between the at least one movable mass and the at least one test structure.

In one embodiment, a method for manufacturing a microelectromechanical device includes forming a support body, forming at least one movable mass of semiconductor material, elastically constrained to the support body to oscillate along one or more axes, and forming fixed detection electrodes rigidly connected to the support body and capacitively coupled to the at least one movable mass. The method includes forming at least one test structure of semiconductor material rigidly connected to the support body, capacitively coupled to the at least one movable mass, and distinct from the fixed detection electrodes and applying, with the at least one test structure, electrostatic forces to the at least one movable mass in response to a voltage between the at least one test structure and the at least one movable mass.

BRIEF DESCRIPTION OF THE SEVERAL VIEWS OF THE DRAWINGS

For a better understanding of principles of the present disclosure, some embodiments thereof will now be described, purely by way of non-limiting example and with reference to the attached drawings, wherein:

FIGS. 9-15 are cross-sections of the wafer incorporating the microelectromechanical device of FIG. 2 in successive processing steps of a method in accordance with an embodiment of the present disclosure.

DETAILED DESCRIPTION

Figure 1:
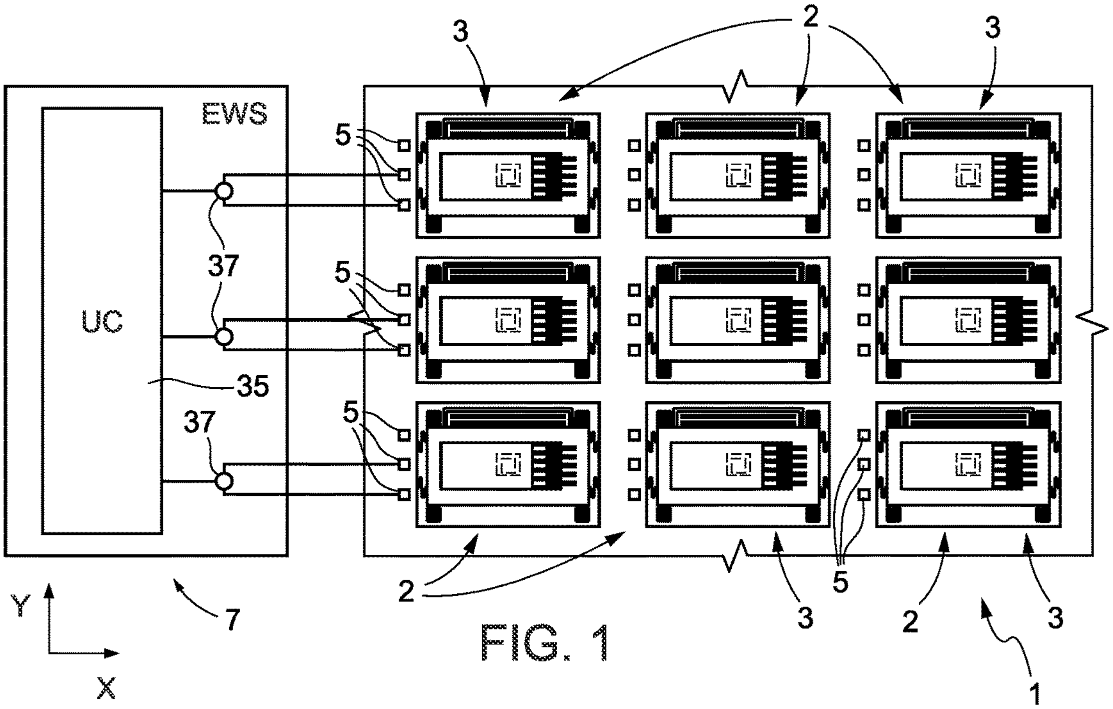
FIG. 1 is a simplified schematic view of a semiconductor wafer and a test machine forming a test equipment in accordance with an embodiment of the present disclosure.

FIG. 1 shows a top-plan view of a semiconductor wafer 1 and a plurality of microelectromechanical devices 2 in accordance with an embodiment of the disclosure integrated in the semiconductor wafer 1. In the case described and illustrated herein, the microelectromechanical devices 2 are two detection-axis gyroscopes, as explained in detail hereinbelow. However, this should not be understood in a limiting sense. The integrated microelectromechanical devices may include gyroscopes of any type (uniaxial, biaxial, triaxial), as well as other inertial sensors (accelerometers, inclinometers) and, in general, microelectromechanical devices having a microstructure with movable parts.

In the example of FIG. 1, each microelectromechanical device 2 present in the wafer 1 includes a microstructure 3 and respective pads 5, connected to the microstructure 3. A test machine 7, for example for EWS (Electrical Wafer Sorting) tests at the wafer level, is connected to the pads 5 to perform tests, at the wafer level, on the functionality of the microelectromechanical devices 2, in particular of the spurious vibration modes of the microstructures 3, as described in detail hereinbelow.

Figure 2:
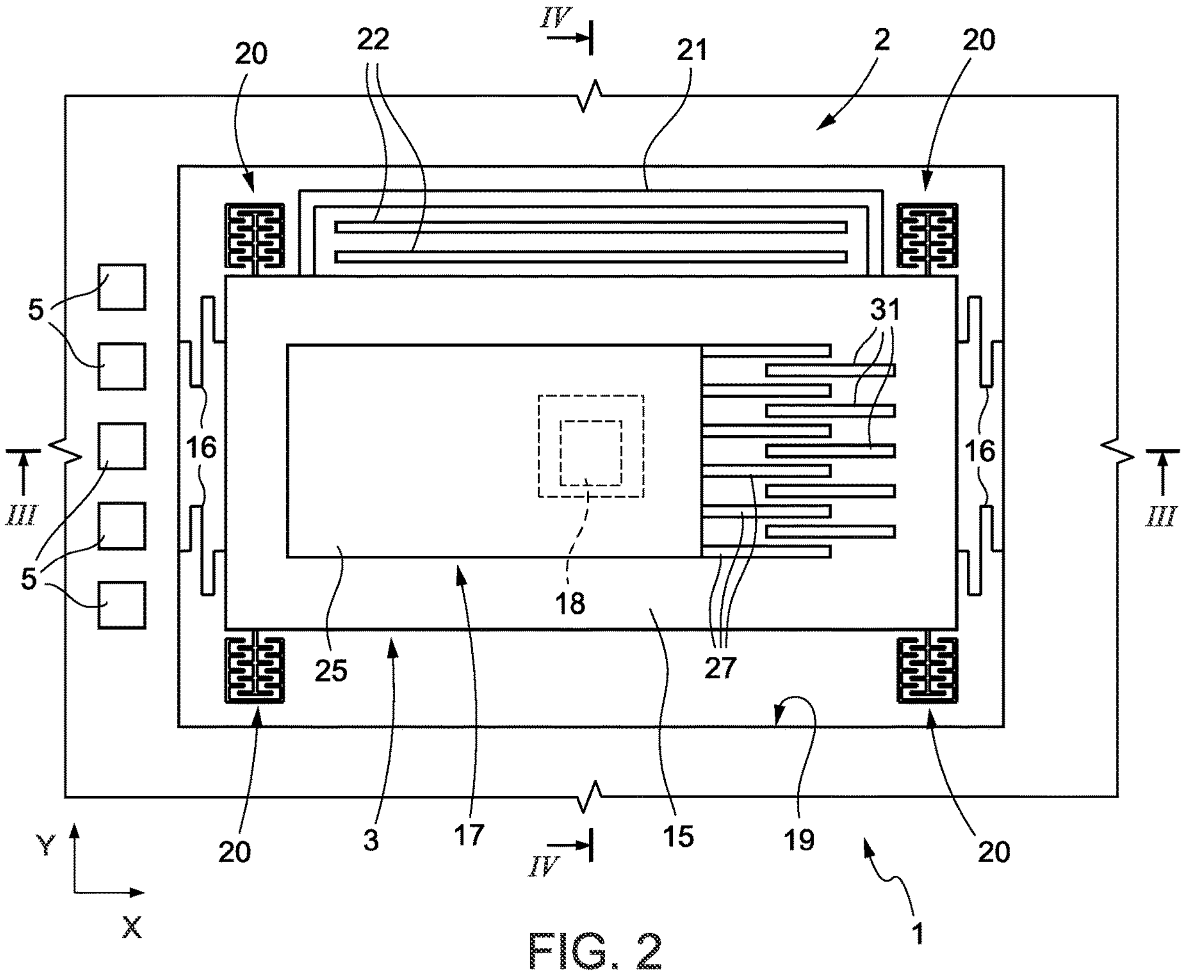
FIG. 2 is a top-plan view of a microelectromechanical device in accordance with an embodiment of the present disclosure, integrated in the wafer of FIG. 1.
Figure 3:
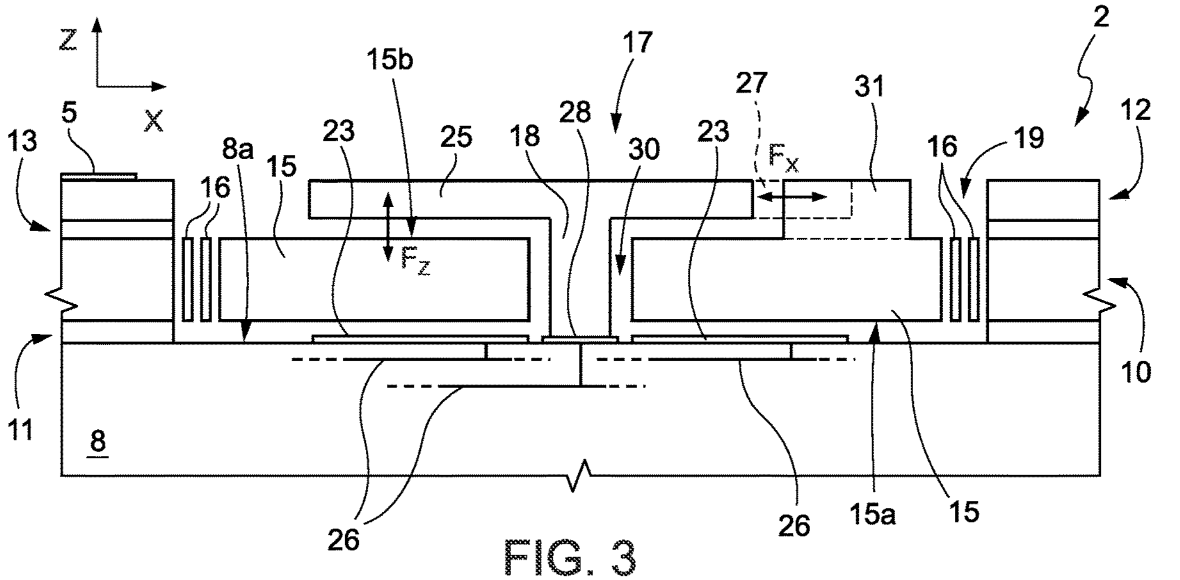
FIG. 3 is a cross-section of the microelectromechanical device of FIG. 2, taken along line III-III of FIG. 2.
Figure 4:
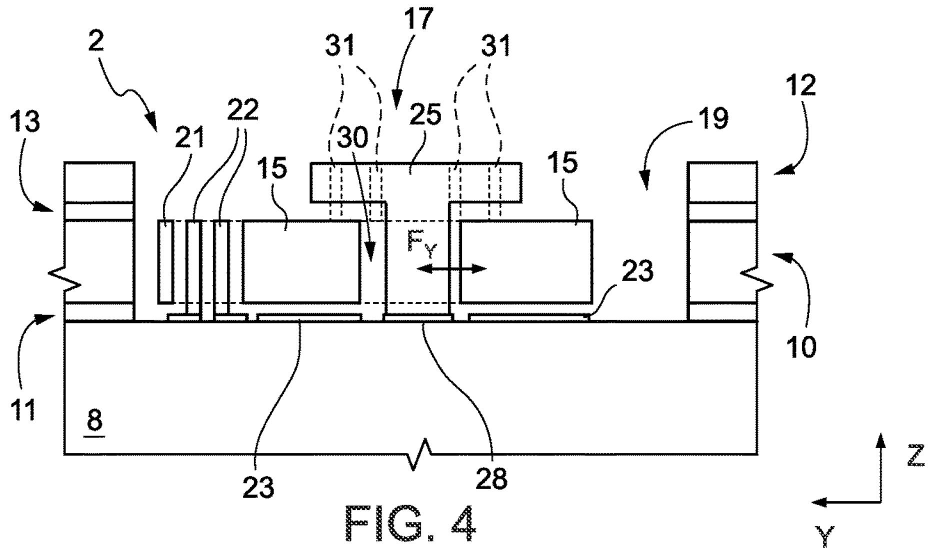
FIG. 4 is a cross-section of the microelectromechanical device of FIG. 2, taken along line IV-IV of FIG. 2.
Figure 5:
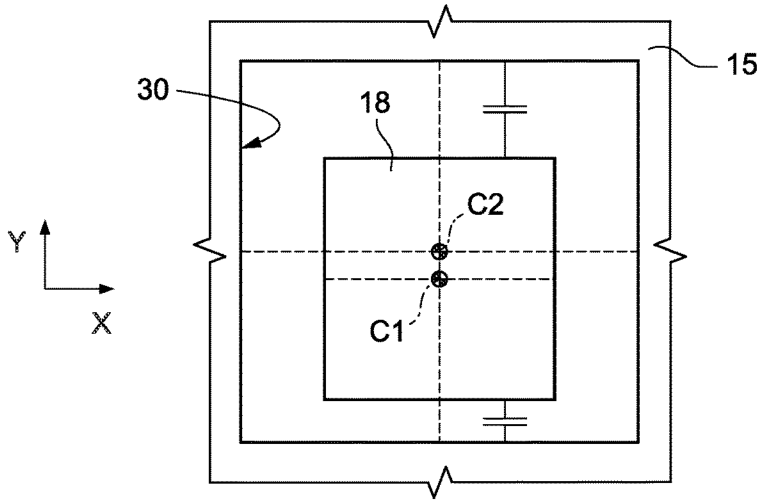
FIG. 5 shows an enlarged detail of the microelectromechanical device of FIG. 2.

FIGS. 2-4 show in greater detail a portion of the wafer 1 where one of the microelectromechanical devices 2 is integrated. As may be seen from FIGS. 2-4, the wafer 1 includes a substrate 8 of semiconductor material, for example monocrystalline silicon, a first structural layer 10, joined to the substrate 8 by a first dielectric layer 11, and a second structural layer 12, joined to the first structural layer 10 by a second dielectric layer 13. The first structural layer 10 and the second structural layer 12 may be semiconductor material layers grown by epitaxy (monocrystalline or polycrystalline epitaxial layers). The microstructure 3 is obtained from the first structural layer 10 and from the second structural layer 12 by separating, by anisotropic etchings, respective portions of the first structural layer 10 and of the second structural layer 12 from the rest of the first structural layer 10 and of the second structural layer 12.

The microstructure 3 includes a movable mass 15, obtained from the first structural layer 10, and a test structure 17, obtained essentially from the first structural layer 10 and from the second structural layer 12 and provided with an anchor 18 for the mechanical and electrical connection to the substrate 8.

The first structural layer 10 and the second structural layer 12 delimit a cavity 19 wherein the movable mass 15 and the test structure 17 are accommodated. In particular, the first structural layer 10 forms a support frame for the movable mass 15. The second structural layer 12 in one embodiment supports the pads 5. The first dielectric layer 11 and the second dielectric layer 13 are not present inside the cavity 19.

The movable mass 15 is constrained to the first structural layer 10 by elastic connection elements 16. In practice, the substrate 8, the first structural layer 10, the first dielectric layer 11, the second structural layer 12 and the second dielectric layer 13 form a support body for the movable mass. In the embodiment described herein, the elastic connection elements 16 are configured to allow the movable mass 15 to oscillate in the cavity 19 with three translational degrees of freedom, parallel and perpendicular to a surface **8*a* of the substrate 8. The movable mass 15 is also provided with drive actuators 20, configured to oscillate the same movable mass 15 along a drive X-axis parallel to the surface 8*a* of the substrate 8. The movable mass 15 further includes one or more movable yaw detection electrodes 21, facing corresponding fixed yaw detection electrodes 22, rigidly connected to the substrate 8. The movable yaw detection electrodes 21 and the fixed yaw detection electrodes 22 define capacitors having flat faces parallel to the X axis, with variable capacitance as a function of displacements of the movable mass 15 along an Y axis parallel to the surface 8*a* of the substrate 8 and perpendicular to the X axis. In the case of the microelectromechanical device 2, the movable mass 15 translates, along the Y axis, in response to yaw movements, i.e., rotations around an axis perpendicular to the surface 8*a* of the substrate 8. One of the sides of the movable mass 15, facing a respective fixed yaw detection electrode 22, may act as a movable yaw detection electrode 21**.

Fixed pitch/roll detection electrodes 23 are located on the substrate 8 and face the movable mass 15, which acts as a movable pitch/roll detection electrode. The movable mass 15 and the fixed pitch/roll detection electrodes 23 define capacitors with variable capacitance as a function of displacements of the movable mass 15 along a Z axis perpendicular to the X axis and to the Y axis. In the case of the microelectromechanical device 2, the movable mass 15 translates, along the Z axis, in response to pitch and/or roll movements, i.e., rotations around an axis parallel to the surface **8*a* of the substrate 8**.

The movable mass 15, with all the movable detection electrodes, and all the fixed detection electrodes are connected to respective pads 5 of the microelectromechanical device 1 through connection lines 26 formed on the substrate 8 and/or embedded therein.

The test structure 17 includes a semiconductor material body which forms the anchor 18, a test plate 25 and a group of fixed test electrodes 27 and is fixed to the substrate 8. The test structure 17 is distinct from the drive actuators 20 and from the fixed detection electrodes 22, 23.

The anchor 18, obtained essentially from the first structural layer 10, includes a pillar fixed to a bias pad 28 placed on the substrate 8 and is electrically (galvanically) isolated both from the same substrate 8 and from the movable mass 15. The bias pad 28 is connected to one of the pads 5 of the microelectromechanical device 1 through one of the connection lines 26. In this manner, during the test step the anchor 18 and the entire test structure may be biased independently of the movable mass 15.

Furthermore, the anchor 18 extends in the direction of the Z axis through an opening 30 in the movable mass 15. The anchor 18 and the opening 30 have respective sides facing each other. In rest conditions, i.e., in the absence of forcing and external stresses, the anchor 18 is off-center with respect to the opening 30 in the movable mass 15. In one embodiment, in particular, a center C1 of the anchor 18 is offset with respect to a center C2 of the opening 30 in the direction of the Y axis, so that the anchor 18 is closer to one of the sides of the movable mass 15 delimiting the opening 30 in the direction of the Y axis than to the opposite side. The different distance causes a different capacitive coupling. Consequently, when a voltage is applied between the movable mass 15 and the anchor 18 of the test structure 17, the electrostatic forces acting on the movable mass 15 are not balanced and the movable mass 15 moves along the Y axis. The anchor 18 in practice defines a test actuator configured to apply test forces $F_Y$ to the movable mass 15 in the direction of the Y axis. In the embodiment of FIGS. 2-4, the movable mass 15 is instead centered with respect to the opening 30 in the direction of the X axis. The forces in the direction of the X axis are therefore balanced and the capacitive coupling between the movable mass 15 and the anchor 18 does not affect the motion of the same movable mass 15.

The test plate 25 is obtained from the second structural layer 12, as are the fixed test electrodes 27, and is connected to the substrate 8 through the anchor 18. The movable mass 15 is arranged between the substrate 8 and the test plate 25 of the test structure 17. Therefore, the movable mass 15 has a first side 15*a* facing the substrate 8 and a second side 15*b* facing the test plate 25.

The movable mass 15 and the test plate 25 face each other and are capacitively coupled. Therefore, a voltage applied between the movable mass 15 and the test plate 25 of the test structure 17 causes electrostatic forces which move the movable mass 15 in the direction of the Z axis. The test plate 25 thus defines a test actuator configured to apply test forces $F_Z$ to the movable mass 15 in the direction of the Z axis.

The fixed test electrodes 27 are defined by respective flat semiconductor plates which extend from one side of the test plate 25 parallel to an XZ plane defined by the X axis and the Z axis. The fixed test electrodes 27 are capacitively coupled to movable test electrodes 31 formed on one face of the movable mass 15 adjacent to the test plate 25. More precisely, the movable test electrodes 31 are defined by respective flat semiconductor plates parallel to the XZ plane, obtained from the second structural layer 12, and are arranged in interdigitated configuration with respect to the fixed test electrodes 27. A voltage applied between the fixed test electrodes 27 of the test structure 17 and the movable test electrodes 31 of the movable mass 15 causes electrostatic forces which move the movable mass 15 in the direction of the X axis. The fixed test electrodes 27 thus define a test actuator configured to apply test forces $F_X$ to the movable mass 15 in the direction of the X axis.

Figure 6:
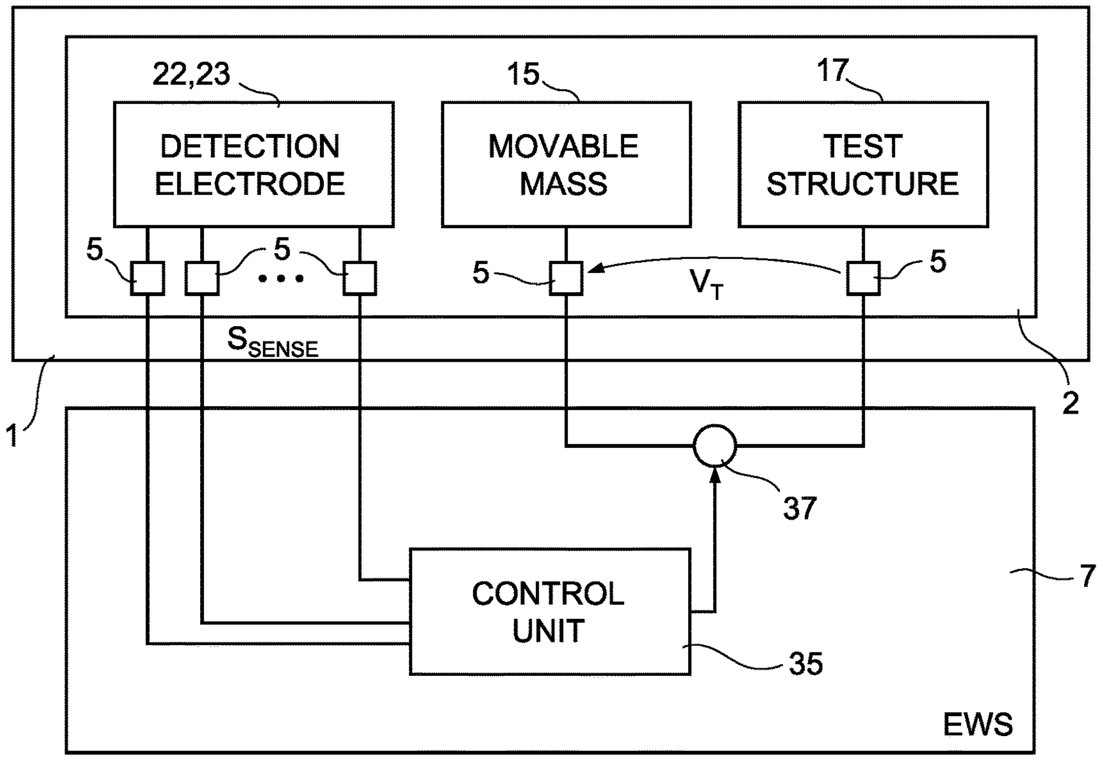
FIG. 6 is a simplified block diagram of the test equipment of FIG. 1.
Figure 7:
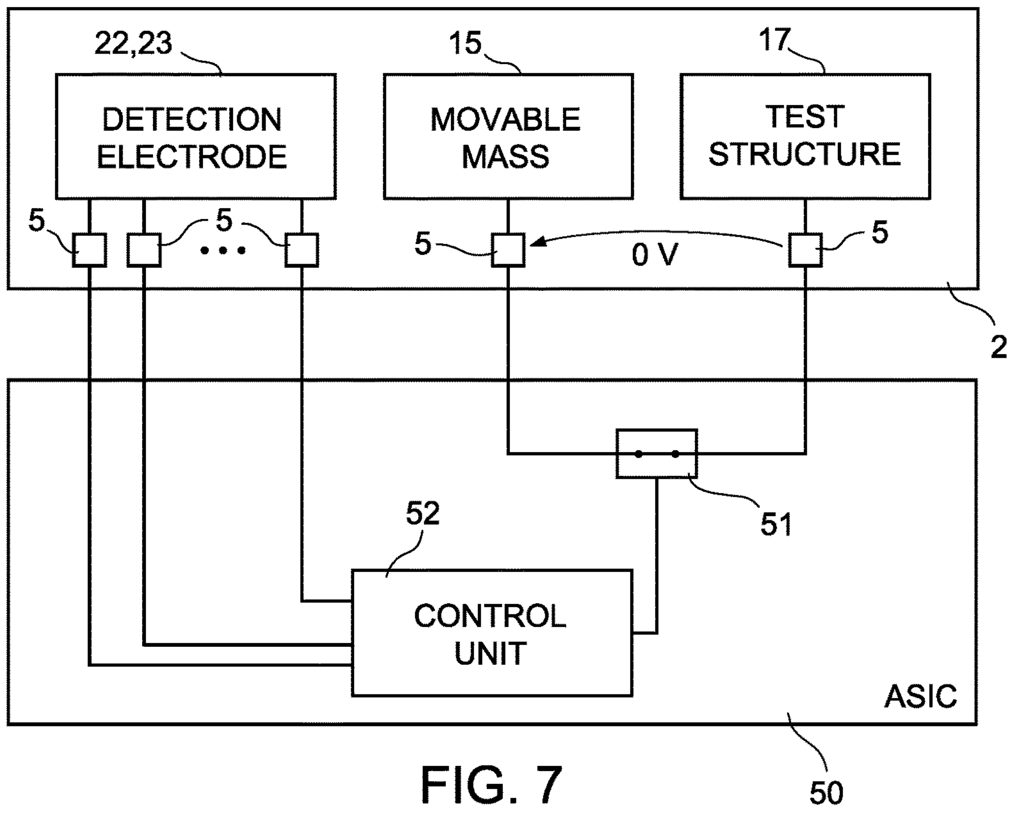
FIG. 7 is a simplified block diagram of the microelectromechanical device of FIG. 2 in use configuration.

With reference to FIG. 6, during an EWS test step, the test machine 7 is connected to the pads 5 of the microelectromechanical devices 2, or at least selectively to groups thereof, integrated in the wafer 1 (for simplicity FIG. 7 illustrates only one microelectromechanical device 1 connected to the test machine 7; FIG. 1 shows a greater number thereof). The test machine 7 includes a control unit 35 and one or more test signal generators 37, controlled by the control unit 35.

The test signal generator 37 is coupled to respective pads 5 so as to apply a test voltage $V_T$ between the movable mass 15 and the test structure 17 under the control of the control unit 35. The test voltage $V_T$ may be for example a sinusoidal voltage with frequency and amplitude controlled by the control unit 35. For example, the frequency of the test voltage $V_T$ may vary over time so as to stress different spurious vibration modes of the microstructure 3 of the microelectromechanical devices 2.

The control unit 35 also has inputs coupled to pads 5 connected to the (fixed) detection electrodes 22, 23 to receive sense signals $S_{SENSE}$ in response to movements of the movable mass 15.

In use, on the other hand, each microelectromechanical device 2 obtained by dicing the wafer 1 is coupled to a respective control integrated circuit or ASIC (Application Specific Integrated Circuit) 50 which maintains the microstructure 15 and the test structure 17 at the same voltage, as shown in FIG. 7. The connection between the microstructure 15 and the test structure 17 may be obtained for example through a switch 51 controlled by a control unit 52 of the ASIC 50 or by a permanent direct connection. In this manner, during normal operation of the microelectromechanical device 1, the test structure 17 has no impact on the response of the movable mass 15 because the voltage between the movable mass 15 and the test structure 17 is zero.

Owing to the capacitive coupling between the fixed test electrodes 27 and the movable test electrodes 31, between the anchor 18 and the movable mass 15 in the opening 30 and between the test plate 25 and the movable mass 15, the test voltage $V_T$ causes test forces $F_X$, $F_Y$, $F_Z$ between the movable mass 15 and the test structure 17 respectively along the X axis, along the Y axis and along the Z axis, as illustrated in FIGS. 3 and 4. In turn, the test forces $F_X$, $F_Y$, $F_Z$ excite the spurious vibration modes of the microstructure 3 and the response is read through the sense signals $S_{SENSE}$, which contain spurious contributions superimposed on the signals induced by the test voltage $V_T$. The microelectromechanical devices 2 which have responses to the test voltage $V_T$ above programmed thresholds are marked as defective.

In practice, therefore, the test structure 17 allows the effect of the spurious vibration modes of the microstructures 3 at the wafer level to be examined. The defective microelectromechanical devices 2 may be identified in a systematic manner and, once the wafer 1 has been diced, eliminated before the assembly operations. The test at the wafer level thus allows a considerable saving of method steps and materials used.

In terms of occupied area and sensitivity of the microelectromechanical devices, the test structure 17 has an almost negligible impact, limited to the dimensions of the opening 30 in the XY plane. In other words, with the same rail area, the reduction of sensitivity due to that the opening 30 reduces the inertia of the movable mass 5 is not significant; in a dual manner, any increase in the dimensions of the movable mass 15 to compensate for the opening 30 would be extremely small. The test structure 17 is in fact mostly superimposed on the movable mass 15 and increases the overall dimensions of the microelectromechanical device 1 mainly in the direction perpendicular to the surface 8*a* of the substrate 8 (along the Z axis). However, the increase in dimensions in this direction is usually not critical.

Principles of the present disclosure may advantageously be utilized in microelectromechanical devices, in particular gyroscopes, with any configuration of movable masses.

Figure 8:
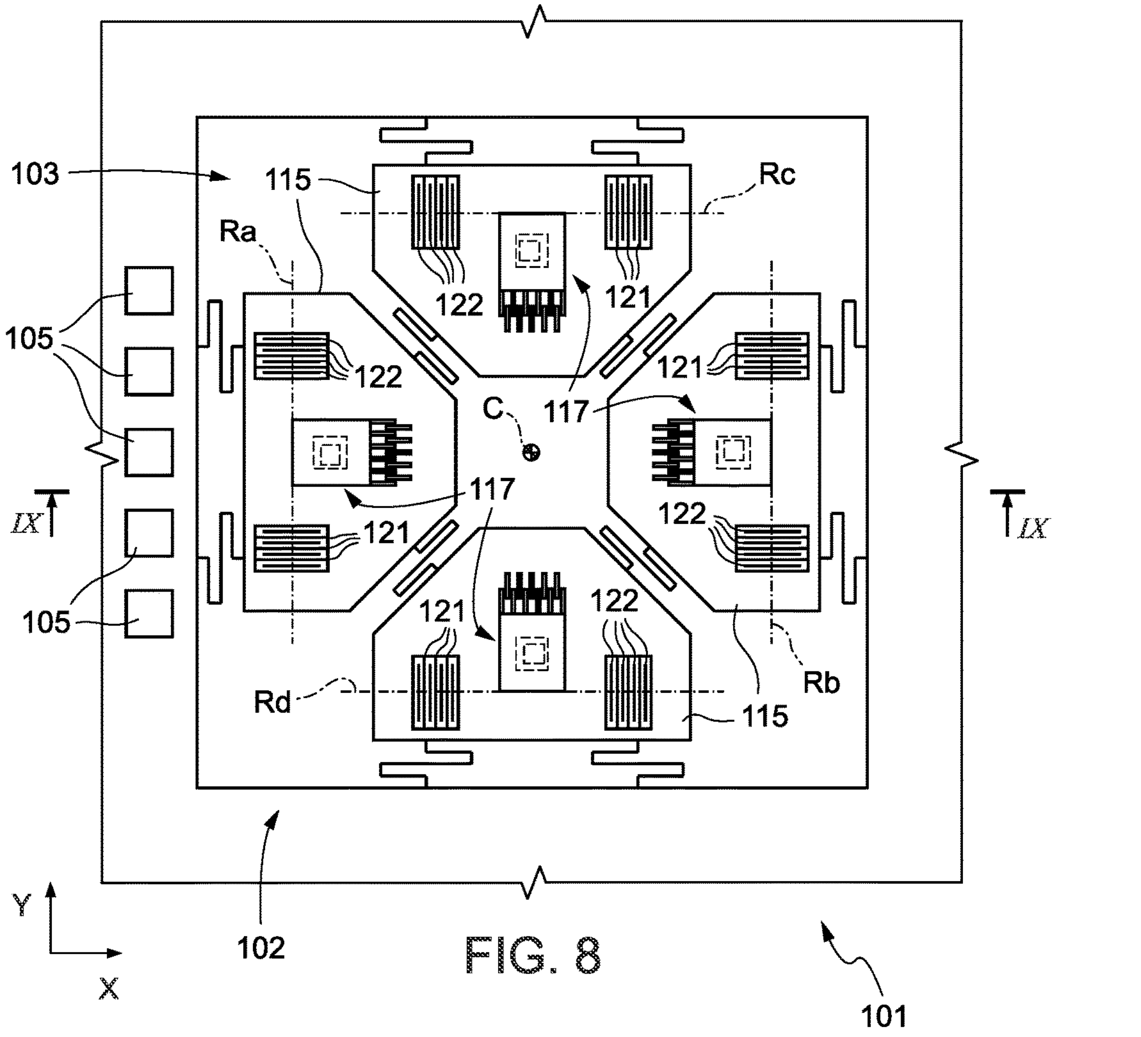
FIG. 8 is a top-plan view of a microelectromechanical device in accordance with a different embodiment of the present disclosure.
Figure 9:
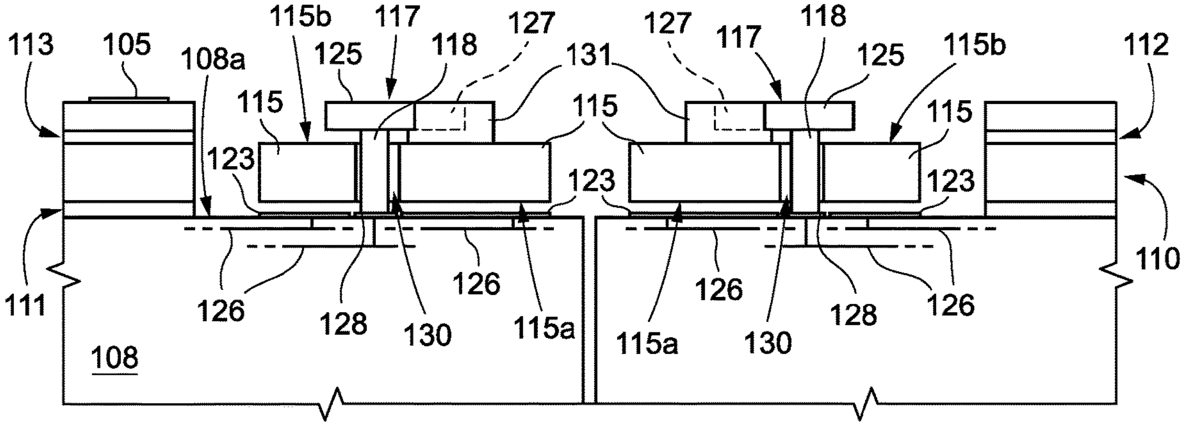
FIG. 9 is a cross-section of the microelectromechanical device of FIG. 8, taken along line IX-IX of FIG. 8.

For example, according to the embodiment illustrated in FIGS. 8 and 9, a semiconductor wafer 101 includes a plurality of microelectromechanical devices 102, in particular triaxial microelectromechanical gyroscopes, only one of which is shown for convenience.

Each microelectromechanical device 102 has a microstructure 103 which includes a support body, four movable masses 115, arranged in specularly symmetrical pairs around a center C. and four test structures 117, each associated with a respective movable mass 115. The support body includes a substrate 108 of the wafer 101, a first structural layer 110, a first dielectric layer 111, a second structural layer 112 and a second dielectric layer 113. The first structural layer 110 and the second structural layer 112 are of semiconductor material, for example grown by epitaxy.

The movable masses 115 are constrained to the support body so as to oscillate in phase opposition in pairs, in a manner known per se. In particular, two movable masses 115 oscillate in phase opposition along an X axis parallel to the surface 108*a* of the substrate 108 and two movable masses 115 oscillate in phase opposition along an Y axis parallel to the surface 108*a* and perpendicular to the X axis. Furthermore, all the movable masses 115 oscillate in phase opposition in pairs around respective rotation axes Ra-Rd parallel to the surface 108*a* of the substrate 108.

The movable masses 115 are provided with respective systems of movable detection electrodes 121, capacitively coupled to respective fixed detection electrodes 122 anchored to the substrate 108. Further fixed detection electrodes 123 arranged on the substrate 108 are capacitively coupled to a face of a respective movable mass 115. The movable masses 115, with all the movable detection electrodes 121, and all the fixed detection electrodes 122, 123 are connected to respective pads 105 of the microelectromechanical device 101 through connection lines 126 formed on the substrate 108 and/or embedded therein.

FIG. 9 shows two of the movable masses 115 and the relative test structures 117. It is understood that the other two movable masses 115 and test structures 117 are substantially identical to those shown in FIG. 9.

Like the movable masses 115, the test structures 117 are also arranged in specularly symmetrical pairs with respect to the center C of the microelectromechanical device 101. Each test structure 117 includes a semiconductor material body which forms an anchor 118, a test plate 125 and a group of fixed test electrodes 127 and is fixed to the substrate 108, substantially as already described. More precisely, each anchor 118 is fixed to a respective bias pad 128 placed on the substrate 108 and is electrically isolated both from the same substrate 108 and from the movable mass 115. The bias pads 128 are connected to respective pads 105 through the connection lines 126.

Each anchor 118 extends in the direction of the Z axis through an opening 130 in the respective movable mass 115. As already described, the anchors 18 are off-center with respect to the respective openings 130. For example, the anchors 118 of the test structures 117 associated with the movable masses 115 oscillating along the X axis are off-center in the direction of the Y axis, so as to define actuators which apply test forces $F_{Y1}$ according to the Y axis. The anchors 118 of the test structures 117 associated with the movable masses 115 oscillating along the Y axis are off-center in the direction of the X axis, so as to define actuators which apply test forces $F_{X1}$ according to the X axis.

The test plates 125 are connected to the substrate 108 through the respective anchors 118. The movable masses 115 are arranged between the substrate 108 on one side and the test plates 125 of the respective test structures 117 on the other side. Therefore, each movable mass 115 has a first side 115*a* facing the substrate 108 and a second side 115*b* facing the test plate 125.

The movable masses 115 and the respective test plates 125 face each other and are capacitively coupled. The test plates 125 thus define test actuators configured to apply electrostatic test forces $F_Z$ to the respective movable masses 115 in the direction of the Z axis.

The fixed test electrodes 127 associated with the movable masses 115 oscillating along the X axis include respective flat semiconductor plates which extend on one side of the respective test plate 125 parallel to an XZ plane defined by the X axis and the Z axis. The fixed test electrodes 127 are capacitively coupled arranged in interdigitated configuration to movable test electrodes 131 formed on the respective movable masses 115. The fixed test electrodes 127 associated with the movable masses 115 oscillating along the X axis thus define test actuators configured to apply test forces $F_{X2}$ to the respective movable masses 15 in the direction of the X axis.

The fixed test electrodes 127 associated with the movable masses 115 oscillating along the Y axis include respective flat semiconductor plates which extend on one side of the respective test plate 125 parallel to a YZ plane defined by the Y axis and the Z axis. The fixed test electrodes 127 are capacitively coupled arranged in interdigitated configuration to movable test electrodes 131 formed on the respective movable masses 115. The fixed test electrodes 127 associated with the movable masses 115 oscillating along the Y axis thus define test actuators configured to apply test forces $F_{Y2}$ to the respective movable masses 115 in the direction of the Y axis.

During the test step, electrostatic forces directed according to the three axes X, Y, Z may be applied to the movable masses 115 through the respective test structures 117 substantially as already described, so as to excite the possible spurious vibration modes of the microstructure 103. Furthermore, the movable masses 115 may be forced into motion individually or simultaneously in various combinations (e.g., in opposite pairs or adjacent pairs) to have a wider range of stresses which may trigger spurious vibration modes.

A method will be summarily described with reference to the embodiment of FIGS. 1-5. However, it is understood that the same method may be applied for the embodiment of FIGS. 8, 9 and, more generally, for any embodiment of the disclosure. In practice, the movable mass 15, the test structure 17 and the fixed and movable detection electrodes are obtained from two structural layers grown epitaxially one on the other, as described in detail hereinbelow. Further details regarding formation of microelectromechanical devices are described in European patent application EP 3 912 953A1, published on Nov. 24, 2021. EP3912953 is incorporated herein by reference in its entirety.

Figure 10:
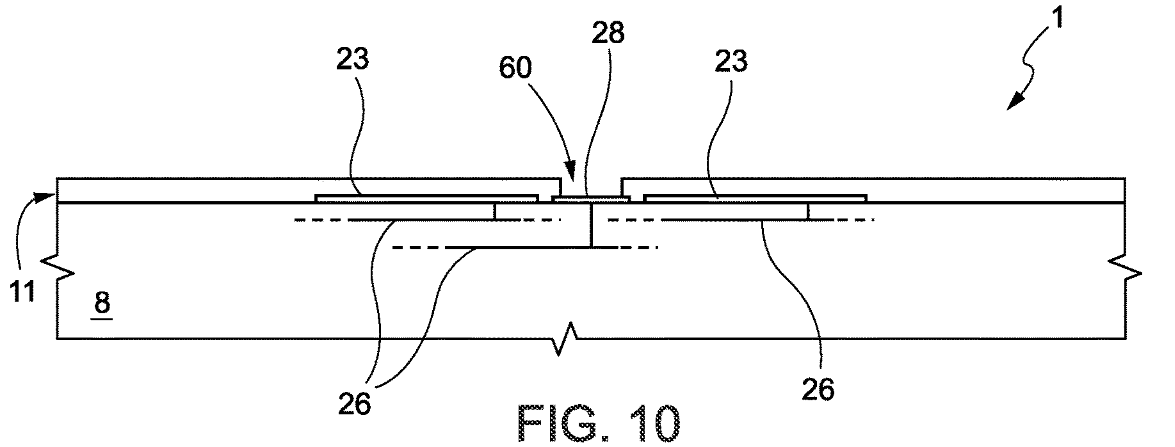

Initially (FIG. 10), the connection lines 26 and, on the substrate 8, the fixed pitch/roll detection electrodes 23 and the bias pad 28 are formed. The first dielectric layer 11 is formed on the substrate 8 and is etched to form a window 60 on the bias pad 28, in a position corresponding to the anchor 18.

Figure 11:
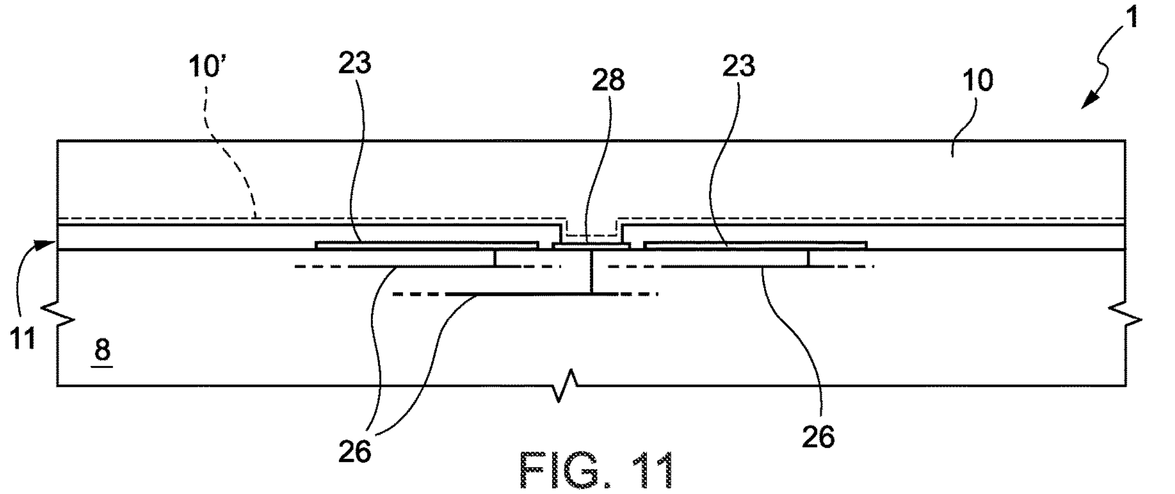

The first structural layer 10 is grown by epitaxy from a seed layer 10' deposited on the first dielectric layer 11 (FIG. 11). The first structural layer 10 then extends over the first dielectric layer 11 and contacts the bias pad 28 through the window 60.

Figure 12:
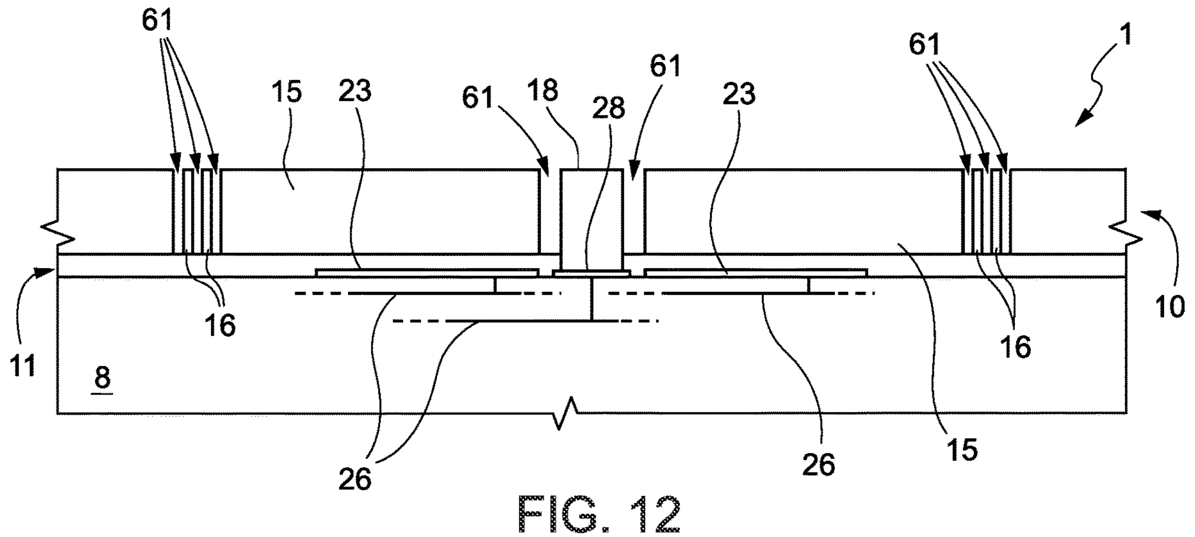

The first structural layer 10, FIG. 12, is then etched to define the movable mass 15, the elastic connection elements 16, the anchor 18, the fixed yaw detection electrodes 22 (not visible in FIG. 12) and possibly other regions provided based on design preferences. The wafer 1 is covered by a resist mask not shown (first trench mask) and subject to a dry etching, forming trenches 61, which completely traverse the first structural layer 10. In this step, trenches (not shown) are also formed through the portion of the first structural layer 10 intended to form the movable mass 15, which will have a lattice structure. The trenches will also serve in the subsequent steps for the removal of portions of the dielectric layer 11, to release the movable mass 15. The etching automatically stops on the first electric layer 11.

Figure 13:
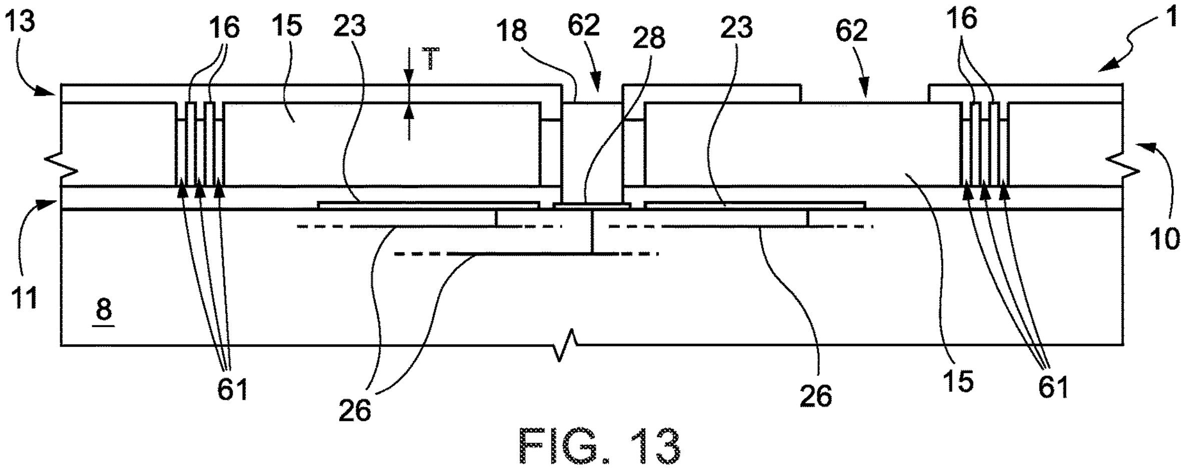

Subsequently, FIG. 13, the second dielectric 13 is deposited, for a thickness T equal to a desired width of a gap between the movable mass 15 and the test plate 25 which will be formed subsequently. The second dielectric layer 13 partially fills the trenches 61, for example for one third of their depth although this filling, as well as the filling extent and depth are not important. The second dielectric layer 13 is then selectively etched and removed throughout its entire thickness, using a masking layer not shown, forming windows 62 in positions corresponding to the anchor 18 and to regions of the movable mass 15 where the movable test electrodes 31 will have to be formed subsequently.

Figure 14:
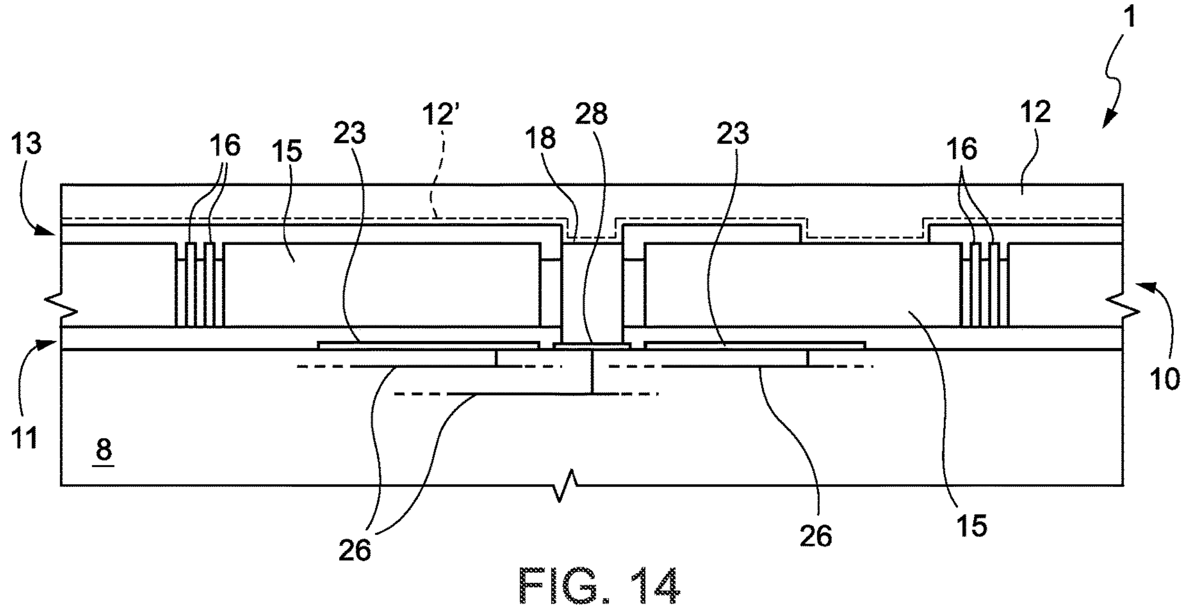

As shown in FIG. 14, the second structural layer 12 is then grown, also in this case by epitaxy, starting from a second deposited seed layer 12'. The thickness of the second structural layer 12 is linked to the desired micro-electro-mechanical structures. In general, the second structural layer 12 may be thinner than the first structural layer 10, although the reverse may occur and the present disclosure is not limited to any particular ratio between the thicknesses of the structural layers 10, 12.

Figure 15:
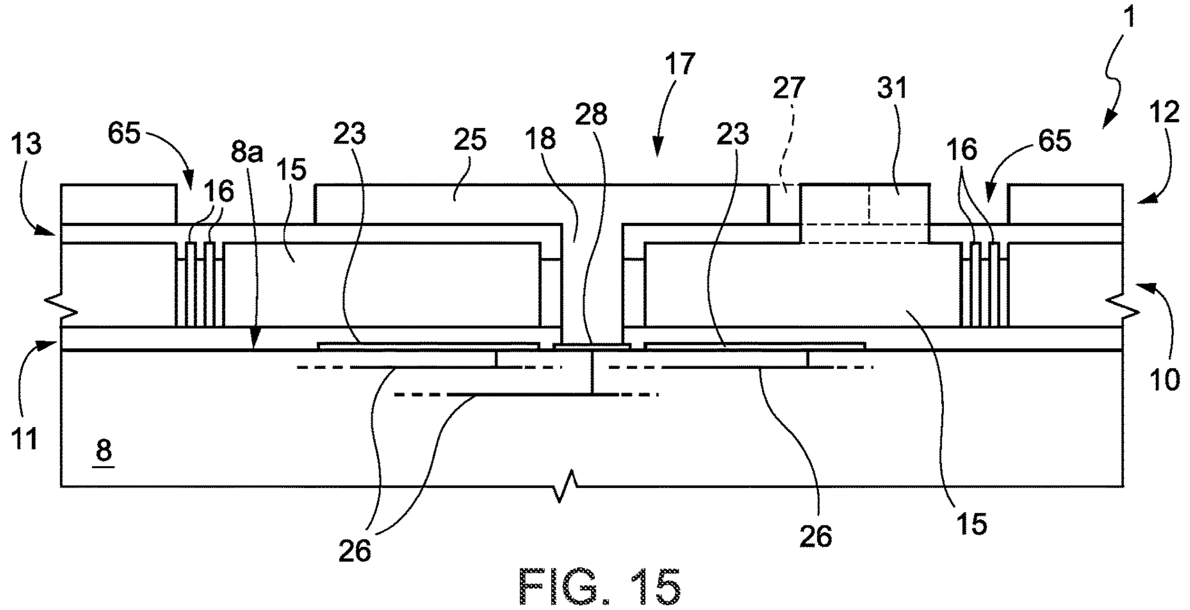

Then, FIG. 15, the second structural layer 12 is etched. The wafer 1 is covered by a resist mask not shown (second trench mask) and subject to a dry etching. In this step, the portions of the second structural layer 12 not covered by the resist mask are removed throughout the entire thickness and the etching stops on the remaining portions of the second dielectric 13. In particular, in this step trenches 65 are opened which completely traverse the second structural layer 12 and the test plate 25, the fixed test electrodes 27 and the movable test electrodes 31 are defined.

Through the trenches 31, 65 and the trenches (not shown) through the movable mass 15, the second dielectric layer 13 and the first dielectric layer 11 are in succession partially removed over and under the movable mass 15, between the movable mass 15 and the test plate 25 and around the anchor 18. The movable mass 15 is thus released and the structure of FIGS. 2-4 is obtained.

Finally, it is clear that modifications and variations may be made to the microelectromechanical device, equipment and method described, without departing from the scope of the present disclosure, as defined in the attached claims.

For example, the fixed and movable test electrodes may form a parallel-plate rather than an interdigitated-plate type actuator. In this case, the fixed and movable electrodes extend in a direction perpendicular (rather than parallel) to the electrostatic force applied to the movable mass.

The anchor may be off-center with respect to the opening in the movable mass both with respect to the X axis and with respect to the Y axis and not only with respect to one of the two.

In some embodiments, the test structure might be limited to the off-center pillar extending through the opening into the movable mass and possibly includes further fixed and movable test electrodes obtained from the first structural layer.

A microelectromechanical device may be summarized as including a support body (8, 10-13; 108, 110-113); at least one movable mass (15; 115) of semiconductor material, elastically constrained to the support body (8, 10-13; 108, 110-113) so as to be able to oscillate along one or more axes (X, Y, Z, Ra-Rd); fixed detection electrodes (22, 23; 122, 123) rigidly connected to the support body (8, 10-13; 108, 110-113) and capacitively coupled to the at least one movable mass (15; 115); and at least one test structure (17; 117) of semiconductor material, rigidly connected to the support body (8, 10-13; 108, 110-113) and distinct from the fixed detection electrodes (22, 23; 122, 123); wherein the at least one test structure (17; 117) is capacitively coupled to the at least one movable mass (15; 115) and is configured to apply electrostatic forces ($F_X$, $F_Y$, $F_Z$) to the at least one movable mass (15; 115) in response to a voltage ($V_T$) between the at least one test structure (17; 117) and the at least one movable mass (15; 115).

The at least one test structure (17; 117) may be electrically isolated from the movable mass (15; 115) and from the substrate (8; 108).

The support body (8, 10-13; 108, 110-113) may include a substrate (8; 108) of semiconductor material; the at least one test structure (17; 117) includes a first portion (25, 27; 125, 127) and a second portion (18, 28; 118, 128); the at least one movable mass (15; 115) may be arranged between the substrate (8; 108) and the first portion (25, 27; 125, 127) of the at least one test structure (17; 117); and the second portion (18, 28; 118, 128) of the at least one test structure (17; 117) may be anchored to the substrate (8; 108) and extends through the at least one movable mass (15; 115).

The first portion (25, 27; 125, 127) of the at least one test structure (17; 117) may include a test plate (25; 125) of semiconductor material and the at least one movable mass (15; 115) may have a first side (17*a*; 115*a*) facing the substrate (8; 108) and a second side (15*b*; 115*b*) facing the test plate (25; 125).

The first portion (25, 27; 125, 127) of the at least one test structure (17; 117) may include fixed test electrodes (27; 127) and the at least one movable mass (15; 115) may include movable test electrodes (31; 131) capacitively coupled to the fixed test electrodes (27; 127).

The fixed test electrodes (27; 127) may extend from the test plate (25; 125) and the movable test electrodes (31; 131) may be arranged on the second side (15*b*; 115*b*) of the at least one movable mass (15; 115) facing the test plate (25; 125).

The fixed test electrodes (27; 127) may be defined by respective flat semiconductor plates extending from the test plate (25; 125) and the movable test electrodes (31; 131) may be defined by respective flat semiconductor plates formed on a face of the movable mass (15; 115) adjacent to the test plate (25; 125) and the fixed test electrodes (27; 127) and the movable test electrodes (31; 131) may be interdigitated.

The at least one movable mass (15; 115) may have an opening (30; 130) and the second portion (18, 28; 118, 128) of the at least one test structure (17; 117) may include an anchor (18, 28; 118, 128) connecting the first portion (25, 27; 125, 127) of the at least one test structure (17; 117) to the substrate (8; 108) and extending through the opening (30; 130) in the at least one movable mass (15; 115).

The anchor (18, 28; 118, 128) may be off-center with respect to the opening (30; 130).

The fixed test electrodes (27; 127) may be configured to apply a first electrostatic test force ($F_X$) in a first direction (X) parallel to a surface (8*a*; 108*a*) of the substrate (8; 108) and the anchor (18, 28; 118, 128) may be off-center with respect to the opening (30; 130) in a second direction (Y) parallel to the surface (8*a*; 108*a*) of the substrate (8; 108) and perpendicular to the first direction (X).

The device may include a plurality of movable masses (115) of semiconductor material, elastically constrained to the support body (108, 110-113) so as to be able to oscillate with respective relative degrees of freedom; and a plurality of test structures (117) of semiconductor material, rigidly connected to the support body (108, 110-113), distinct from the fixed detection electrodes (122, 123) and each capacitively coupled to a respective of the movable masses (115).

The movable masses (115) and the respective test structures (117) may be arranged in specularly symmetrical pairs around a center (C).

The device may include pads (5; 105) accessible from the outside, wherein the at least one movable mass (15; 115) and the at least one test structure (17; 117) are electrically coupled to respective pads (5; 105).

The device may include a control integrated circuit (50) connected to the pads (5) and configured to set a zero voltage between the at least one microstructure (15) and the at least one test structure (17).

A test equipment for testing microelectromechanical devices may be summarized as including a semiconductor wafer (1) integrating a plurality of microelectromechanical devices (2) and a test machine (7) connected to the pads (5) of the microelectromechanical devices and including at least one test signal generator (37), configured to apply a test voltage ($V_T$) between the at least one movable mass (15) and the at least one test structure (17).

A method for manufacturing a microelectromechanical device, may be summarized as including forming a support body (8, 10-13; 108, 110-113); forming at least one movable mass (15; 115) of semiconductor material, elastically constrained to the support body (8, 10-13; 108, 110-113) so as to be able to oscillate along one or more axes (X, Y, Z, Ra-Rd) along one or more axes (X, Y. Z. Ra-Rd); forming fixed detection electrodes (22, 23; 122, 123) rigidly connected to the support body (8, 10-13; 108, 110-113) and capacitively coupled to the at least one movable mass (15; 115); and forming at least one test structure (17; 117) of semiconductor material, rigidly connected to the support body (8, 10-13; 108, 110-113) and distinct from the fixed detection electrodes (22, 23; 122, 123); wherein the at least one test structure (17; 117) is capacitively coupled to the at least one movable mass (15; 115) and is configured to apply electrostatic forces ($F_X$, $F_Y$, $F_Z$) to the at least one movable mass (15; 115) in response to a voltage ($V_T$) between the at least one test structure (17; 117) and the at least one movable mass (15; 115).

Forming the support body (8, 10-13; 108, 110-113) may include forming a first dielectric layer (11; 111), growing a first structural layer (10; 110) on the first dielectric layer (11; 111) by epitaxy from a first deposited seed layer (10'), forming a second dielectric layer (13; 113) on the first structural layer (10; 110) and growing a second structural layer (12; 112) on the second dielectric layer (13; 113) by epitaxy from a second deposited seed layer (12'); forming the at least one movable mass (15; 115) may include forming a first window (60) in the first dielectric layer (11; 111) before growing the first structural layer (10; 110) and selectively etching the first structural layer (10; 110) up to the first dielectric layer (11; 111); and forming the at least one test structure (17; 117) may include forming second windows (62) in the second dielectric layer (13; 113) before growing the second structural layer (12; 112) and selectively etching the second structural layer (12; 112) up to the second dielectric layer (13; 113).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical device, comprising:

a support body;

at least one movable mass of semiconductor material, elastically constrained to the support body to oscillate along one or more axes;

fixed detection electrodes rigidly connected to the support body and capacitively coupled to the at least one movable mass; and at least one test structure of semiconductor material, rigidly connected to the support body and distinct from the fixed detection electrodes;

wherein the at least one test structure is capacitively coupled to the at least one movable mass and is configured to apply electrostatic forces to the at least one movable mass in response to a voltage between the at least one test structure and the at least one movable mass, wherein:

the support body includes a substrate of semiconductor material;

the at least one test structure includes a first portion and a second portion;

the at least one movable mass is arranged between the substrate and the first portion of the at least one test structure; and wherein the second portion of the at least one test structure is anchored to the substrate and extends through the at least one movable mass.

2. The device according to claim 1, wherein the at least one test structure is electrically isolated from the movable mass and from the substrate.

3. The device according to claim 1, wherein the first portion of the at least one test structure includes a test plate of semiconductor material and wherein the at least one movable mass has a first side facing the substrate and a second side facing the test plate.

4. The device according to claim 3, wherein the first portion of the at least one test structure includes fixed test electrodes and wherein the at least one movable mass includes movable test electrodes capacitively coupled to the fixed test electrodes.

5. The device according to claim 4, wherein the fixed test electrodes extend from the test plate and the movable test electrodes are arranged on the second side of the at least one movable mass facing the test plate.

6. The device according to claim 5, wherein the fixed test electrodes are respective flat semiconductor plates extending from the test plate and the movable test electrodes are respective flat semiconductor plates formed on a face of the movable mass adjacent to the test plate and wherein the fixed test electrodes and the movable test electrodes are interdigitated.

7. The device according to claim 6, wherein the at least one movable mass has an opening and wherein the second portion of the at least one test structure includes an anchor connecting the first portion of the at least one test structure to the substrate and extending through the opening in the at least one movable mass.

8. The device according to claim 7, wherein the anchor is off-center with respect to the opening.

9. The device according to claim 8, wherein the fixed test electrodes are configured to apply a first electrostatic test force in a first direction parallel to a surface of the substrate and wherein the anchor is off-center with respect to the opening in a second direction parallel to the surface of the substrate and perpendicular to the first direction.

10. The device according to claim 1, comprising a plurality of movable masses of semiconductor material, elastically constrained to the support body to oscillate with respective relative degrees of freedom; and a plurality of test structures of semiconductor material, rigidly connected to the support body, distinct from the fixed detection electrodes and each capacitively coupled to a respective one of the movable masses.

11. The device according to claim 10, wherein the movable masses and the respective test structures are arranged in specularly symmetrical pairs around a center.

12. The device according to claim 1, comprising pads accessible from the outside, wherein the at least one movable mass and the at least one test structure are electrically coupled to respective pads.

13. A method for manufacturing a microelectromechanical device, comprising:

forming a support body;

forming at least one movable mass of semiconductor material, elastically constrained to the support body to oscillate along one or more axes;

forming fixed detection electrodes rigidly connected to the support body and capacitively coupled to the at least one movable mass;

forming at least one test structure of semiconductor material rigidly connected to the support body, capacitively coupled to the at least one movable mass, and distinct from the fixed detection electrodes; and applying, with the at least one test structure, electrostatic forces to the at least one movable mass in response to a voltage between the at least one test structure and the at least one movable mass, wherein:

the support body includes a substrate of semiconductor material;

the at least one test structure includes a first portion and a second portion;

the at least one movable mass is arranged between the substrate and the first portion of the at least one test structure; and wherein the second portion of the at least one test structure is anchored to the substrate and extends through the at least one movable mass.

14. The method according to claim 13, wherein:

forming the support body includes forming a first dielectric layer, growing a first structural layer on the first dielectric layer by epitaxy from a first deposited seed layer, forming a second dielectric layer on the first structural layer and growing a second structural layer on the second dielectric layer by epitaxy from a second deposited seed layer;

forming the at least one movable mass includes forming a first window in the first dielectric layer before growing the first structural layer and selectively etching the first structural layer up to the first dielectric layer; and forming the at least one test structure includes forming second windows in the second dielectric layer before growing the second structural layer and selectively etching the second structural layer up to the second dielectric layer.

15. A method, comprising:

coupling a test machine of test equipment to contact pads of a first microelectromechanical device, the first microelectromechanical device including:

a movable mass of semiconductor material elastically constrained to a support body to oscillate along one or more axes;

fixed detection electrodes rigidly connected to the support body and capacitively coupled to the movable mass; and a test structure of semiconductor material rigidly connected to the support body, capacitively coupled to the movable mass, distinct from the fixed detection electrodes, and configured to apply electrostatic forces to the movable mass in response to a voltage between the test structure and the movable mass, wherein the movable mass and the test structure are each electrically coupled to a respective one of the contact pads; and testing the first microelectromechanical device by applying, with a test signal generator of the test machine, a test voltage between the movable mass and the test structure via the contact pads, wherein:

the support body includes a substrate of semiconductor material;

the test structure includes a first portion and a second portion;

the movable mass is arranged between the substrate and the first portion of the at least one test structure; and wherein the second portion of the at least one test structure is anchored to the substrate and extends through the at least one movable mass.

16. The method of claim 15, wherein the microelectromechanical device is implemented in a wafer that includes a second microelectromechanical device substantially identical to the first microelectromechanical device, the method comprising:

coupling the test machine to contact pads of the second microelectromechanical device; and testing the second microelectromechanical device by applying, with the test signal generator of the test machine, the test voltage between the at least one movable mass and the at least one test structure of the second microelectromechanical device via the contact pads of the second microelectromechanical device.

17. The method of claim 15, wherein the test voltage includes a sinusoidal voltage with a frequency that varies over time.

18. The method of claim 15, comprising receiving, with a test control unit of the test machine via input contact pads, sense signals from the detection electrodes based on movements of the movable mass responsive to the test voltage.

* * * * *